United States Patent [19]
Rowe et al.

[11] Patent Number: 5,265,764
[45] Date of Patent: Nov. 30, 1993

[54] APPARATUS FOR PNEUMATICALLY DISPENSING A BAGGED SOFT FROZEN PRODUCT

[75] Inventors: James H. Rowe, Forest City, Ark.; Bruce D. Parten, San Antonio, Tex.

[73] Assignee: Ro-Co Manufacturing Co., Brenham, Tex.

[21] Appl. No.: 748,456

[22] Filed: Aug. 22, 1991

[51] Int. Cl.$^5$ .............................................. B65D 35/28
[52] U.S. Cl. ......................................... 222/95; 222/132; 222/146.6; 222/325; 222/389
[58] Field of Search ............... 222/95, 131, 132, 146.1, 222/146.6, 185, 325, 389, 399

[56] References Cited

U.S. PATENT DOCUMENTS

| | | | |
|---|---|---|---|
| 4,077,544 | 3/1978 | Malacheski et al. | 222/95 |
| 4,450,987 | 5/1984 | Boettcher et al. | 222/146.6 X |
| 4,577,783 | 3/1986 | Racca et al. | 222/389 X |
| 4,842,167 | 6/1989 | Fornasari | 222/389 X |
| 5,060,826 | 10/1991 | Coleman | 222/95 |
| 5,069,364 | 12/1991 | McGill | 222/326 X |
| 5,076,471 | 12/1991 | Coleman | 222/95 X |
| 5,114,045 | 5/1992 | Herpe | 222/146.6 |

*Primary Examiner*—Gregory L. Huson
*Attorney, Agent, or Firm*—Pravel Hewitt Kimball & Krieger

[57] ABSTRACT

Apparatus for pneumatically dispensing a bagged soft frozen product using low pressure air, the apparatus including a free floating piston and a cylinder with a low friction index, and additionally providing for a double acting piston.

20 Claims, 16 Drawing Sheets

FIG. 13      190

APPARATUS FOR PNEUMATICALLY DISPENSING A BAGGED SOFT FROZEN PRODUCT

FIELD OF THE INVENTION

This invention relates to an apparatus for pneumatically dispensing a bagged soft frozen product with low pressure air.

BACKGROUND OF THE INVENTION

It is known in the art to dispense soft frozen product, such as soft ice creams, from machines where the ice cream is produced in, or loaded directly into, a cylinder of the machine. Use of such apparatus involves the disadvantage of having to periodically clean all parts of the machine that have come into contact with the product. This cleaning process, required for hygienic purposes, is usually nightly. The cleaning is slow, laborious and involves removing and replacing parts of the machine, thereby running the risk of misassembly. Ice cream in the machine at cleaning time is wasted.

Dispensing soft frozen product that is stored in and/or delivered in a nippled bag solves the above cleaning problem. Few parts of the dispensing apparatus come into contact with the product. Those that do can be easily reached and cleaned. The product in the machine is not lost in the cleaning process. Furthermore, the quality control of the product is significantly enhanced when it is mixed by the manufacturer of the ingredients and shipped in a bag. Variations in quality caused by the mixing of the product by inexperienced personnel is eliminated.

It is possible to produce a countertop pneumatic dispensing apparatus for soft bagged product that operates on 110 volts, thereby increasing the market the product. The capacity to operate at 110 volts, combined with minimized daily maintenance problems and a great lessening of associated hygenic issues, as discussed above, opens many new locations as potential sites for a dispensing machine. Moreover, as a replacement machine, it will probably offer significant yearly energy savings from costs of operation.

A competitive countertop model can be designed to dispense multiple products, each from two gallon bags. It is possible in such a model to provide for a short product reload and/or change time, in the order of a minute. Each feature adds a competitive advantage to the machine.

SUMMARY OF THE INVENTION

The present invention discloses apparatus for pneumatically dispensing a bagged soft product at temperatures between 0° F. and 30° F. using low pressure air. The invention includes a cylinder for containing the bagged product, the inside surface of the cylinder having a low friction index. A satisfactory low friction index in a particular case is a function of the exact temperature range of the operation required by a specific product line, the viscosity of the soft product and whether or not a lubricant, discussed below, is also utilized. In general, an average roughness of 5-15 microns (average of peak to valley variation) has proved a satisfactory low friction index for purposes of this invention. For purposes of the present invention, a low friction index can also be described in terms of a low piston break away pressure. A piston break away pressure of 5-10 psi has proved a satisfactory low piston break away pressure for purposes of this invention.

The invention also includes a free floating piston with seal, the piston and seal being dimensioned to sealably and slidably engage the walls of the cylinder, and means for communicating pneumatic air to the cylinder.

The invention, in some embodiments, includes further cylinder characteristics. One characteristic is a high dimensional stability in the relevant temperature range. A second characteristic is a low capacity to transfer heat (i.e. a capacity to act as a heat insulator) in the 0° F. to 30° F. temperature range. In preferred embodiments the piston may contain a plurality of seals.

A first pressure chamber is formed in the cylinder between the piston, the cylinder and an enclosed end of the cylinder. A second pressure chamber may be formed in the cylinder between the other side of the piston, the cylinder and a second enclosed end. The pressure chambers contain apertures that connect them to the means for communicating pneumatic air. An air valve may be attached to the means for communicating pneumatic air. This air valve may have a first setting that directs pneumatic air to the first pressure chamber and a second setting that directs pneumatic air to the second pressure chamber. The air valve may further have an exhaust port for communicating air from the first pressure chamber to regions outside of the apparatus. An additional air dryer and an air pressure regulator means may be attached to the means for communicating pneumatic air. A preferred regulator means would have an air pressure monitor and a means for adjusting the pressure of the pneumatic air.

The apparatus may include refrigerator coils attached to the apparatus that maintain the temperature of the product in the cylinder in a temperature range between 0° F. and 30° F. Preferably, the coils are spaced from the cylinder wall. An appropriate spacing in one embodiment has been found to lie between 3/16 of an inch and ¼ of an inch. The invention may include a heat conducting plate placed in contact with the refrigerator coils. The plate is preferably located on a side of the coil opposite the cylinder wall.

A lubricant or gel may be applied to the interior surface of the cylinder. An FDA silicon lubricant is an acceptable lubricant.

The free floating piston of the present invention has the advantage of not requiring a push rod. Thus, the dispensing apparatus can be packaged efficiently in a cabinet suitable for countertop location, such as at convenience stores, without having to allow for space for the operation of a rod. Furthermore, preferred embodiments of the present invention can operate at 110 volts.

The present invention, in preferred embodiments, provides the advantage of a double acting piston. That is, the pneumatic air source can be used to reverse the direction of the piston, thereby obviating the need for any manual retraction of the piston and possible damage to the machine thereby. This is considered to be an advantage in simplicity, efficiency and cleanliness over piston systems, such as bellows pistons, that are not two-way and thus automatically retractable.

Further, the refrigeration system disclosed for preferred embodiments of the invention is efficiently designed to maintain bagged soft product within a cylinder within the appropriate temperature range, without inducing either hot spots or cold spots, while operating off of 110 volts.

DETAILED DESCRIPTION OF THE PREFERRED EMBODIMENTS

Figure 1:
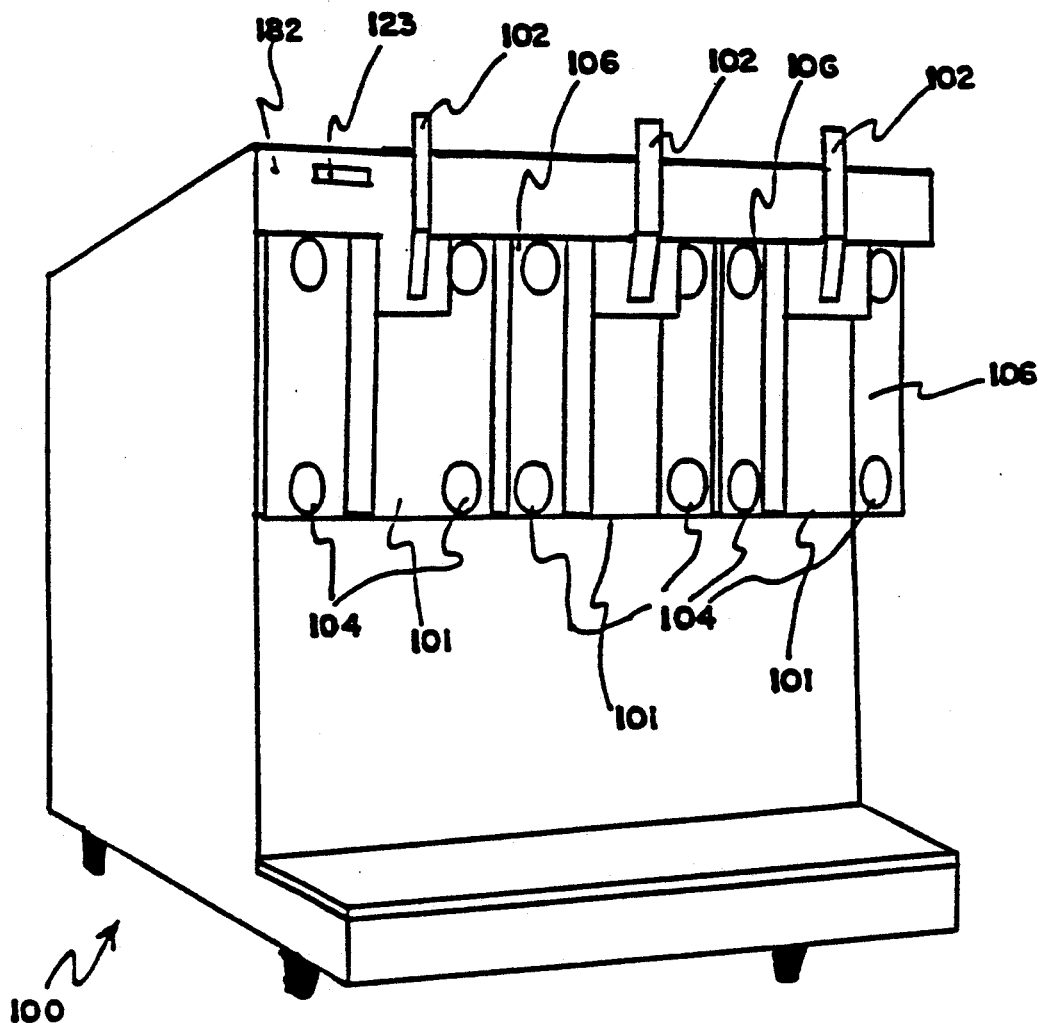
FIGS. 1, 2 and 3 offer schematic views of the outside of a soft product dispenser.
Figure 2:
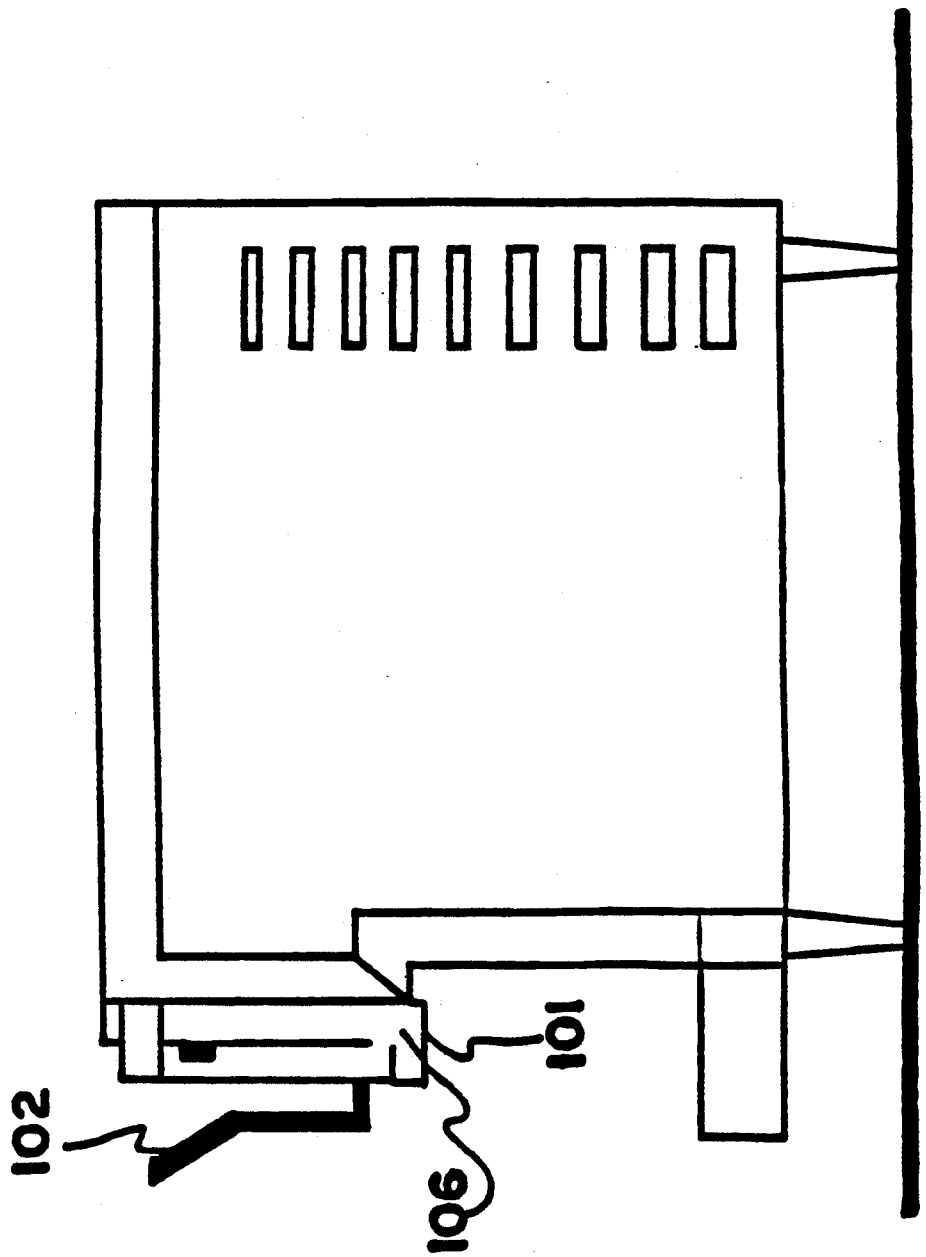
Figure 3:
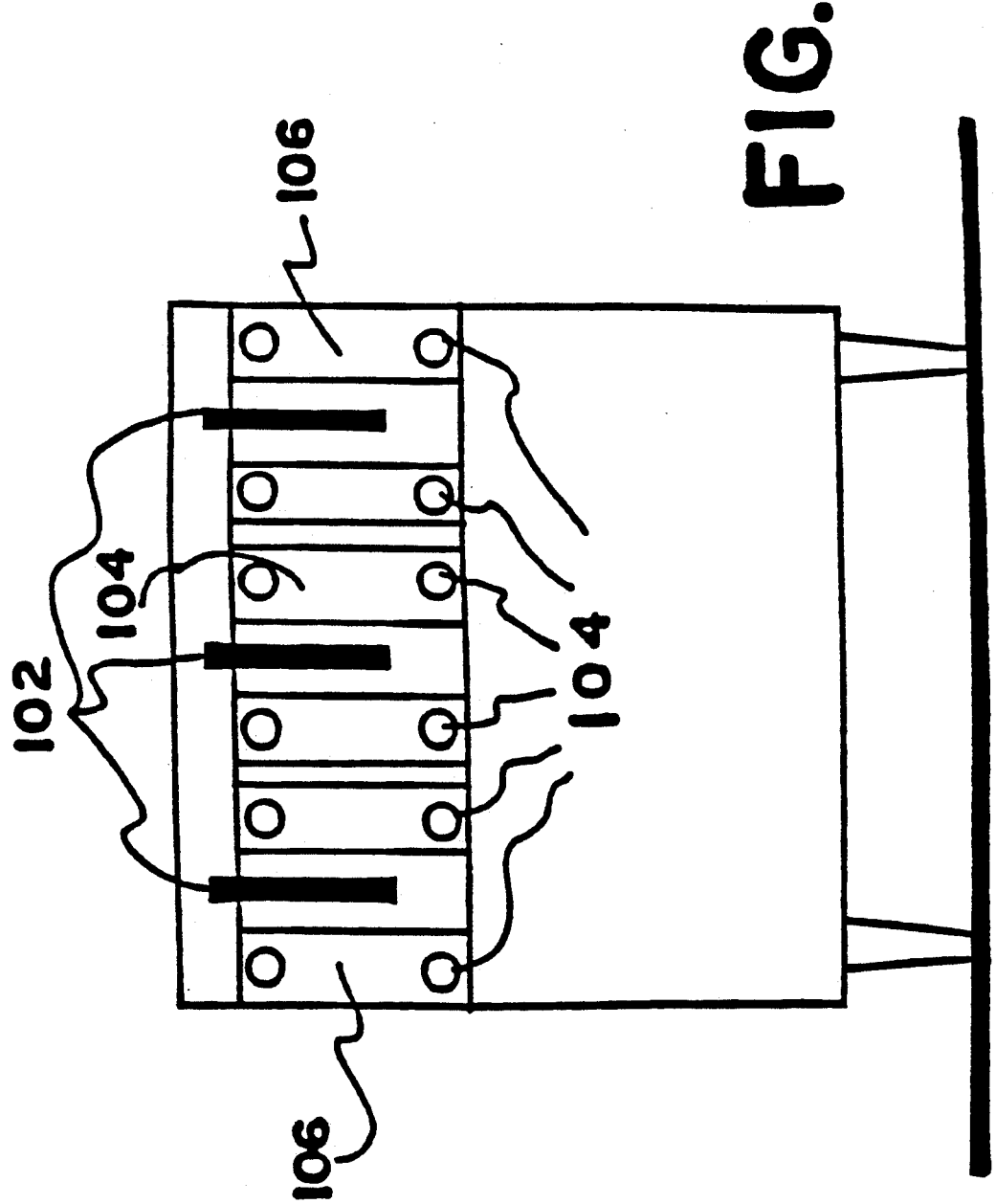

FIGS. 1, 2 and 3 offer in schematic form three views of a preferred embodiment of the present invention. Dispenser 100 is shown enclosed in a cabinet suitable for placement on a countertop, such as a convenience store countertop. The dispenser configured would have dimensions of approximately 24 inches wide, 33 inches deep and 28 inches high, and can operate off of 110 volts. Handles 102 are pulled down to dispense product out of area 101. Screw knobs 104 attach front plates 106 to front cabinet 182, thereby securing the front plates to the apparatus. Element 123 indicates an air valve switch, displayed in greater detail in FIG. 14.

Figure 7:
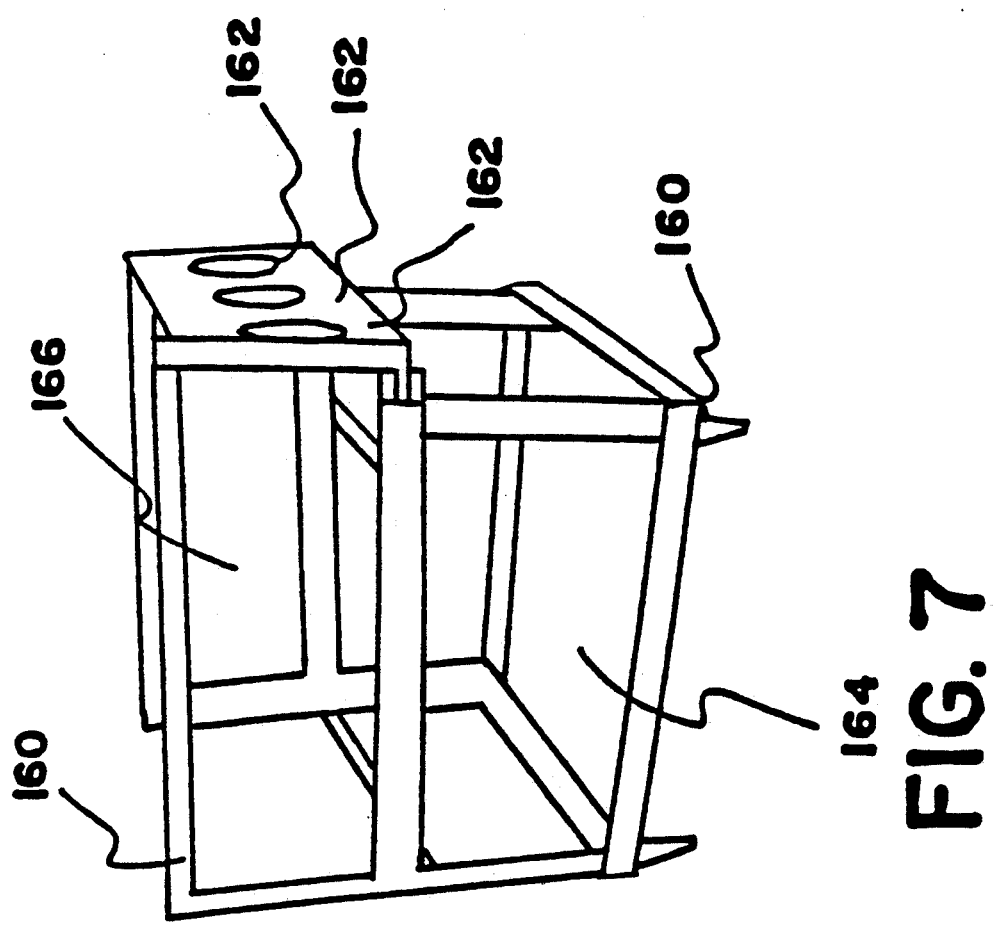
FIGS. 7, 8 and 9 offer a schematic of features of the construction of a preferred embodiment.

FIG. 7 illustrates the frame for the preferred embodiment of dispenser 100 of FIG. 1. Frame elements 160 define space 164 and space 166. Space 164 provides an area in which to locate the condenser, the compressor and other related equipment of the refrigerating system (not shown), as well as the source of pneumatic air and associated equipment. Space 166 defines an area in which three 24" long, 6" diameter cylindrical tubes are stored horizontally. The cylinders are secured in the front to front flange elements 162, shown attached to frame elements 160.

Figure 8:
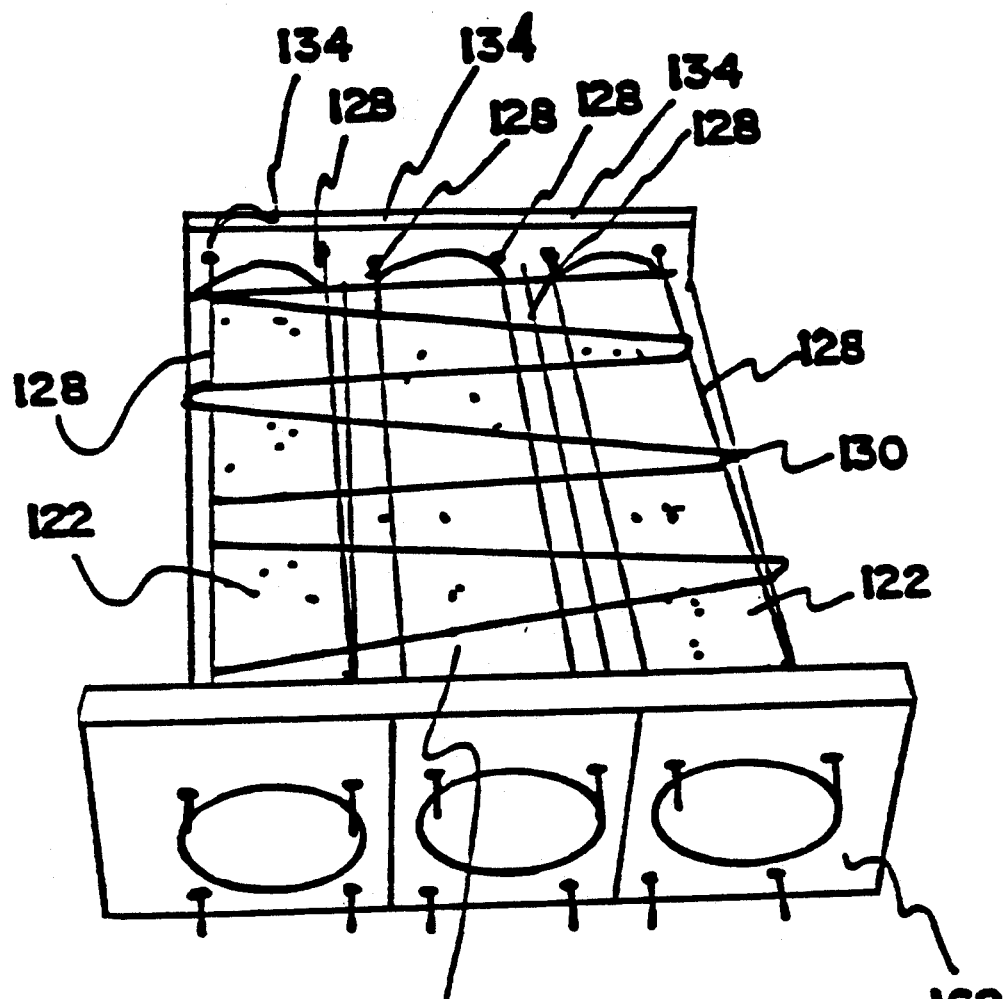
Figure 9:
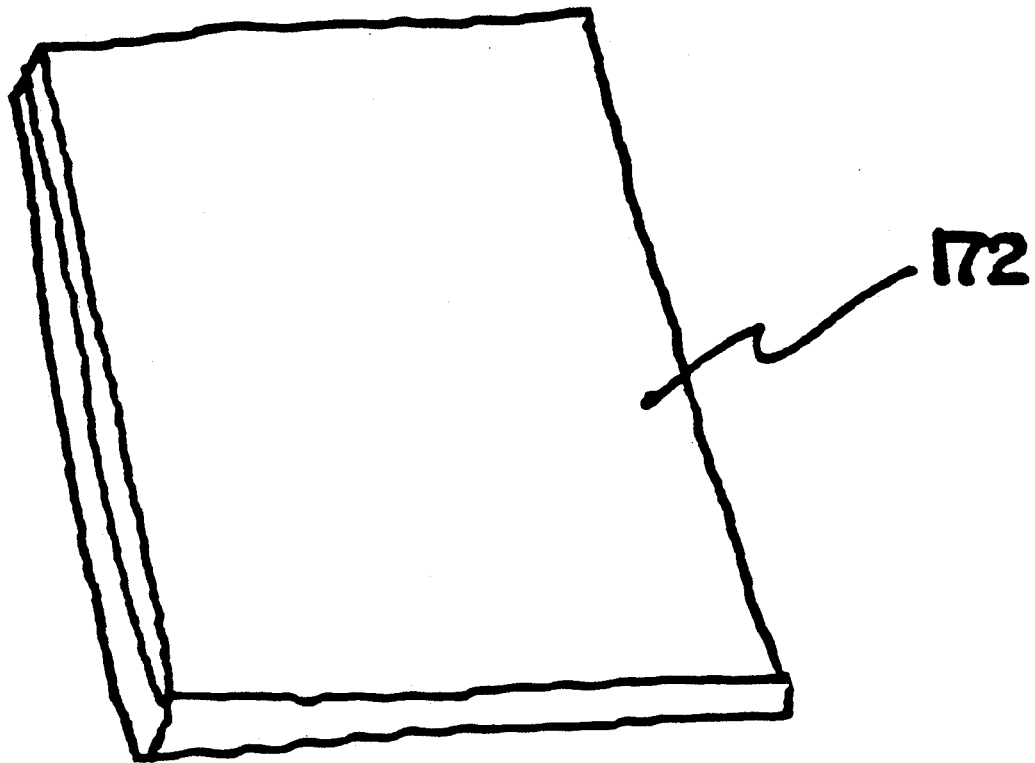

FIG. 8 illustrates the three cylinders, each attached to a front flange element 162, in greater detail. In the preferred embodiment the cylinders are maintained firmly attached to end pieces by means of rods 128. As can be seen in FIG. 8, rods 128 extend from and through the end pieces associated with the cylinders, such as end flanges 134 and 162. By means of rods 128 the cylinders 122 and their end pieces are structurally integrated into a unit. Further, in the preferred embodiment, refrigeration coils 130 are attached to structural rods 128. Refrigeration coils are also present on the underside of the cylinder unit. In one preferred embodiment, conducting plate 172, illustrated in FIG. 9, is placed in contact with refrigeration coils 130. In this embodiment the coils lie between the plate and the cylinders. A plate is preferably attached to both the top coils and the underside coils. Further, in the preferred embodiment, rods 128 hold refrigeration coils 130 spaced from the walls of the cylinder. It has been found that a preferred spacing is in the order of 3/16 of an inch to ½ of an inch.

Figure 4:
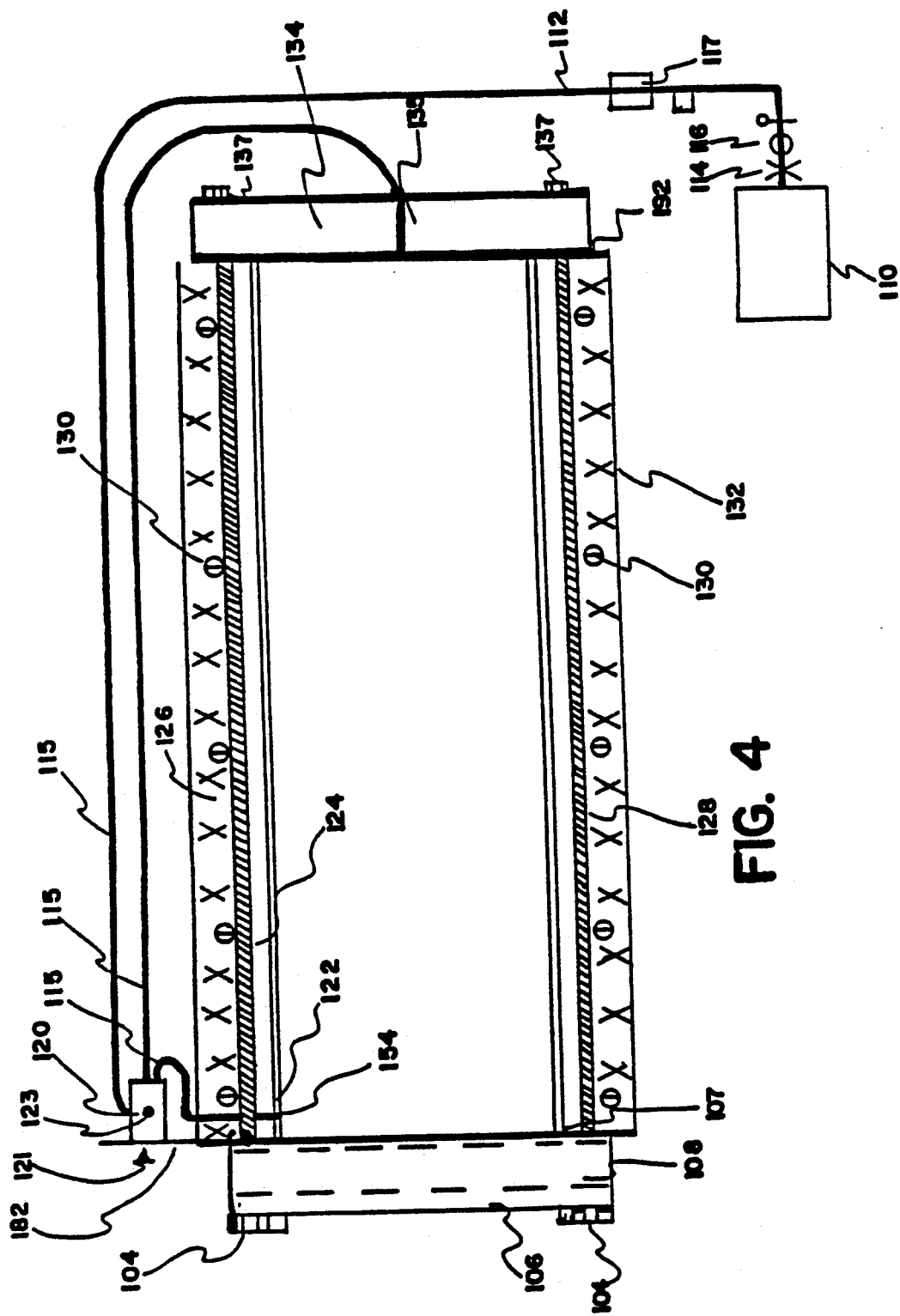
FIGS. 4, 5 and 6 offer schematics for the dispensing system.
Figure 5:
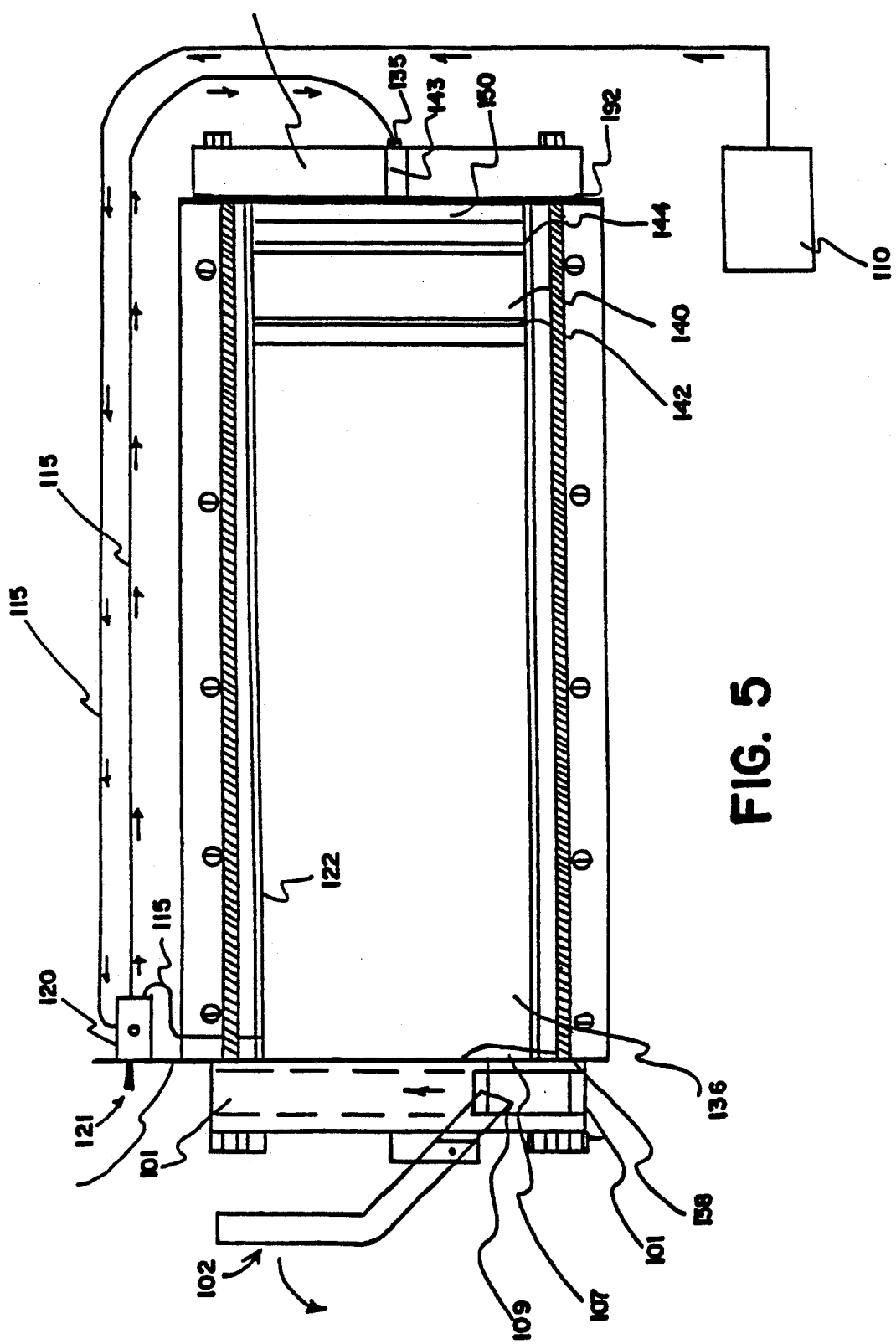
Figure 6:
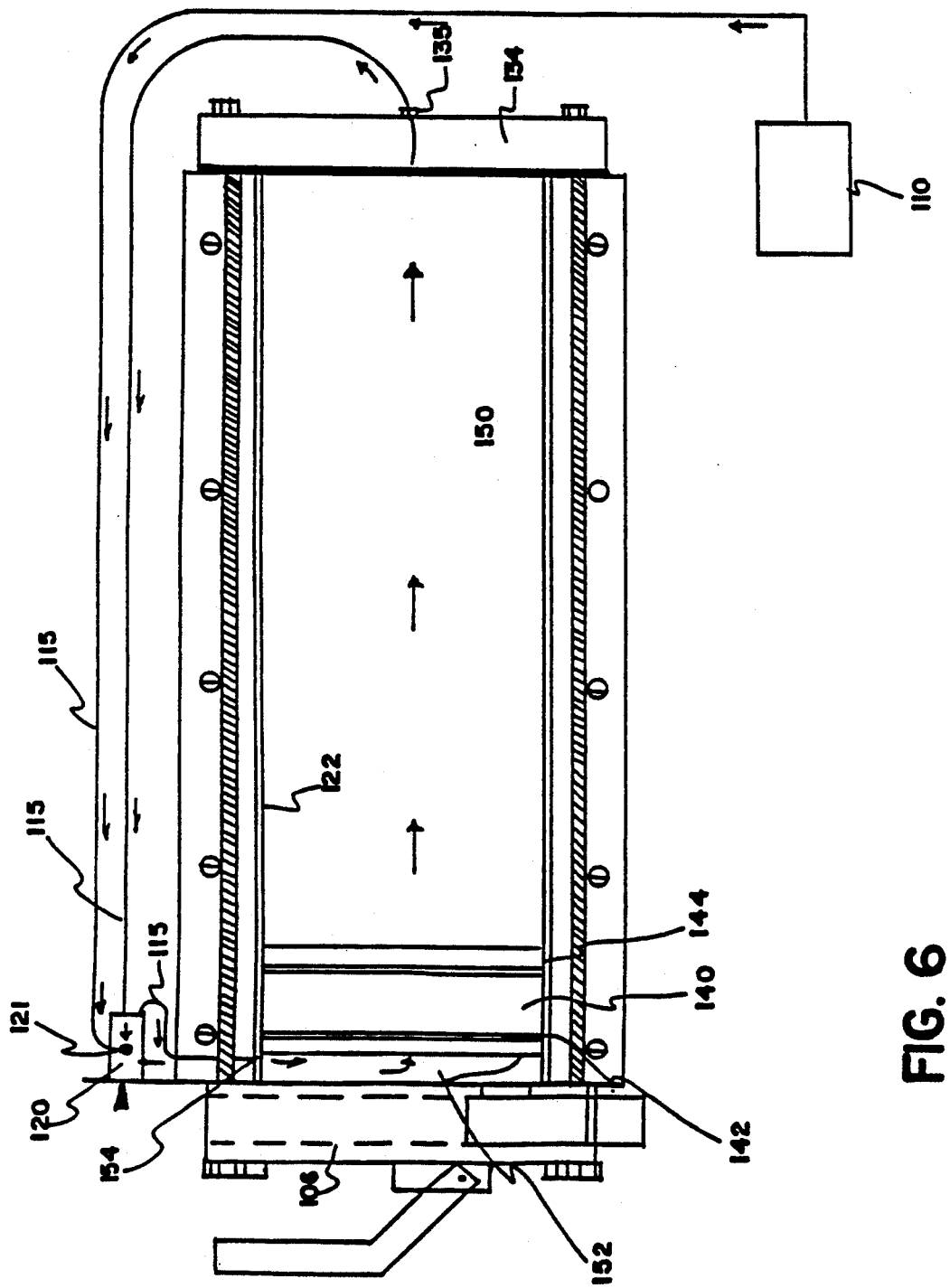

FIGS. 4, 5 and 6 illustrate schematically the dispensing apparatus for a soft frozen bagged product. (When the word "frozen" is used, it is assumed that the product will be required to be maintained at a temperature of between 0° F. and 30° F.)

In FIG. 4 cylinder 122 is shown schematically incorporated between front end piece 106 and rear end piece 134. FIGS. 10, 11, 12 and 13 illustrate in more detail a composite of end pieces utilized in the preferred embodiment. These details are omitted in FIGS. 4, 5 and 6, although element 192 illustrates an insulating portion of the rear end piece arrangement for the cylinder. In FIG. 4 space 124 is a dead air space provided between cylinder 122 and refrigeration tubing 130.

Support rods 128 are illustrated as structurally integrating the cylinder with its front and back end pieces. Structural rods 128 moreover provide support for refrigeration coils 130. Element 126 indicates insulation to be placed above and around the coils. Conducting plate 172 is not shown in the schematics of FIGS. 4, 5 and 6. If conducting plate 172 were utilized in the schematic of FIG. 4, then insulation 126 would be placed above conducting plate 172, which plate in turn would lie in contact with coils 130, both above and below cylinder 122.

Nuts 137 in the rear and screw knobs 104 in the front secure the end pieces to the cylinder by rods 128.

FIG. 4 illustrates pneumatic air source 110 communicating by means of tubing 115 with cylinder 122 through apertures 135 and 154. Additional air dryer 117 and air valve 120 are shown attached to the pneumatic air communication tubing 115. Air dryer 117 is utilized to remove additional moisture from the low pressure pneumatic air to reduce the freezing of air vapor on the inside walls of the cylinder. Air valve 120 is shown attached to the top cabinet piece 182. Air valve 120 is operated by air valve toggle switch 121. Air valve 120 includes exhaust port 123 for exhausting air from pressure chamber 150 (FIG. 5) within the cylinder, when necessary. The air exhaust port is utilized primarily when the pneumatic air system is used to return the piston to an initial position (the FIG. 5 position) prior to loading a new bag of product in the cylinder.

The side view of cylinder front end piece 106 illustrates channels 107 and 108 in the front end piece. Channels 107 and 108 permit product to be dispensed from a nipple in bag 136 contained in cylinder 122.

FIG. 4 further schematically illustrates reservoir 114, pressure switch 116 and regulator 118 that together comprise an air pressure regulation means located on the pneumatic communication lines. Reservoir 114 is used as a holding chamber to hold air. It contains as a safety measure a pop-off valve to release air if the air pressure should exceed a stated maximum, such as 35 psi, the air pressure of the preferred embodiment. Pressure switch 116 is an electrical switch and monitors the air pressure in reservoir 114, maintaining the air pressure between a minimum and a maximum, such as between 20 psi and 35 psi. Pressure switch 116 also contains a safety unloading valve that will exhaust extra air if the pressure exceeds the maximum set range. Regulator 118 will be set for the maximum and desired pressure, such as 35 psi. Regulator 118, in conjunction with pressure switch 116, performs an air pressure maintaining function. Regulator 118 raises air pressure if the air pressure is lower than its set amount, such as 35 psi, thereby adjusting the pressure of the air. Regulator 118 may also maintain a filter and automatic drain to clean the pneumatic air system of particles and moisture. Not withstanding the filter and automatic drain of regulator 118, an additional air dryer 117 may be desired in many embodiments.

FIG. 5 offers a schematic analysis similar to FIG. 4, but in FIG. 5 a bag 136 with nipple 138 has been added within cylinder 122. In addition, piston 140 with seals 142 and 144 is shown within cylinder 122. It can be seen that piston 140 is a free floating piston. That is, piston 140 does not engage a push rod. The absence of a push rod or equivalent device enables the packaging of the cylinders with their en pieces and associated equipment into a compact space or cabinet.

FIG. 5 illustrates a first pressure chamber 150 between end piece 192, cylinder 122 and piston 140. pneumatic air from compressed air source 110 is illustrated as traveling through the pneumatic air communicating tubing 115, including through air valve 120, and into pressure chamber 150 through aperture 135 in the end piece 134 and channel 143 in end pieces 134 and 192. A suitable low air pressure, such as 35 psi, will be applied.

The dispensing apparatus operates as follows. When handle 102 is lowered, it causes plunger 109 to rise in cavity 108, thereby permitting product to be dispensed through nipple 138, channel 107 and out of area 106 at the bottom of the lower portion of channel 108. The product is dispensed under the low pressure pneumatic air force in chamber 150, pressing piston 140 against the rear of product bag 136. When handle 102 is returned to its upright position, plunger 109 seals off channel 107 and inhibits the further dispensing of product from product bag 136.

FIG. 6 is analogous to FIGS. 4 and 5, except piston 140 has moved to its far left position, thereby having dispensed all product from bag 136. Piston 140 is prohibited from moving further left by the lesser inner diameter of the portion of front cabinet piece 182 cut out for the cylinder. FIG. 6 illustrates a manipulation of air valve 120 whereby pneumatic air from pneumatic air source 110 travels through pneumatic air communication tubing 115 and aperture 154 into second pressure chamber 152, located between front end piece 106, cylinder 122 and piston 140. Air from chamber 150 is exhausted through aperture 135 in rear end piece 134 and pneumatic air communication tube 115 to air valve 120 and out air valve exhaust port 121. After the piston has been returned to its initial, or far right position (FIG. 5), the operator can open the front end piece, remove the old bag, lubricate the inside walls of cylinder 122 if necessary, and install a new bag.

FIGS. 4, 5 and 6 have demonstrated the operation of a dual acting free floating piston dispensing system. In order to operate with a low pressure pneumatic air source in the temperature range in which water vapor freezes, the inside surface of cylinder 122 should have a low friction index. A material exhibiting an average roughness of between five to fifteen microns has been found effective. Alternately described, a material with a piston break away pressure of between 5 to 10 psi illustrates, in general, an acceptable low friction interior surface for a cylinder. Such a low friction index, or as alternately described, a low piston break away pressure, is advantageous to overcome the resistance to piston movement caused by the freezing of water vapor within the cylinder at the operating temperatures. A precisely acceptable low friction index is a function of many factors, such as the exact temperature range maintained, the viscosity of the actual product dispensed, whether or not lubricant is used and the extent to which the pneumatic air is dried.

In some embodiments, cylinder 122 has a low thermal conductivity. That is, it is preferable if cylinder 122 is constructed of a material that tends to be a heat insulator. A material with a thermal conductivity of approximately 1.3 BTU/hour/ft$^2$/inch/° F. has proven to have a satisfactory low thermal conductivity.

It is further preferable in some embodiments if cylinder 122 exhibits a high level of dimensional stability. That is, it is preferable if, in the range of 0° F. to 30° F., the cylinder does not greatly contract or expand radially. A material with a coefficient of thermal expansion of approximately $12 \times 10^{-6}$/° K. (circumferential, for a six inch diameter) has proven to have a satisfactory high level of dimensional stability.

It has been found that black amalgon ™ cylinder tubing, produced by Amalga Composites, Inc. of West Allis, Wisconsin, offers a cylinder material that combines many of the preferred advantages for the present invention.

Figure 10:
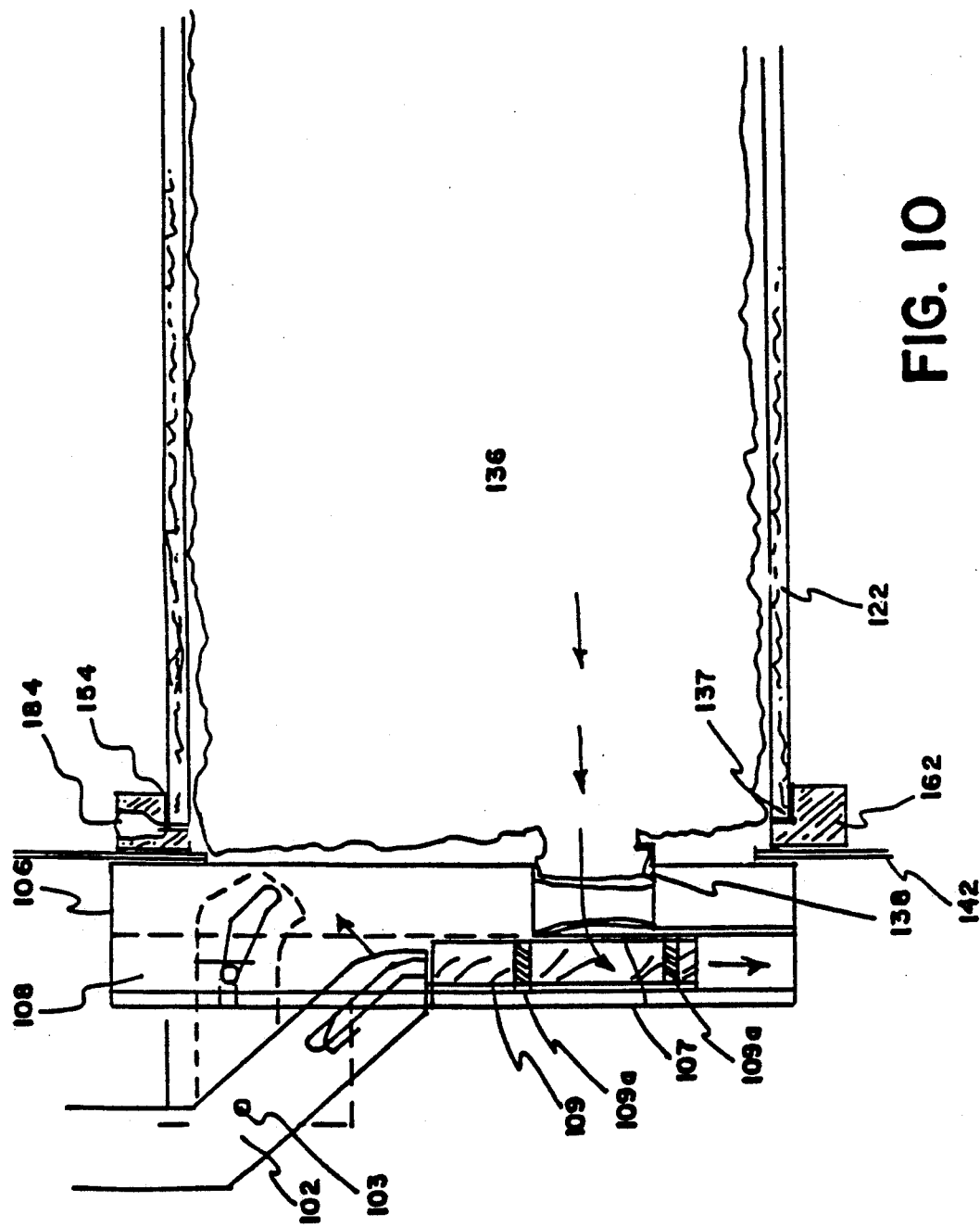
FIGS. 10, 11, 12 and 13 offer schematics of the dispensing system, including the structure of the cylinder and associated parts.

FIG. 10 illustrates in greater detail certain aspects of the structure of the preferred embodiment. It can be seen from FIG. 10 that in the preferred embodiment, cylinder 122 is encased in the front within flange 162, having the same inner diameter as cylinder 122 and providing a shoulder 137 for containing cylinder 122. Front cabinet piece 182 is also cut out around cylinder 122 but has a slightly lesser inside diameter. In such manner cabinet front piece 182 provides a stop for cylinder 140 in its direction of most forward motion. Front piece 106 is secured against front cabinet piece 182 by means of screw bolts 104, attaching to structural rods 28, not shown in FIG. 10, that pass through front end pieces 106, 182 and 162.

Front piece 106 contains appropriate slots to permit handle 102 to swivel around pivot point 103 and raise plunger 109 in slot 108. Handle 102 in FIG. 10 is indicated in its swiveled open position by dashed lines. FIG. 10 illustrates that nipple 138 of bag 136 friction fits into slot 107 of front end piece 106.

Figure 15:
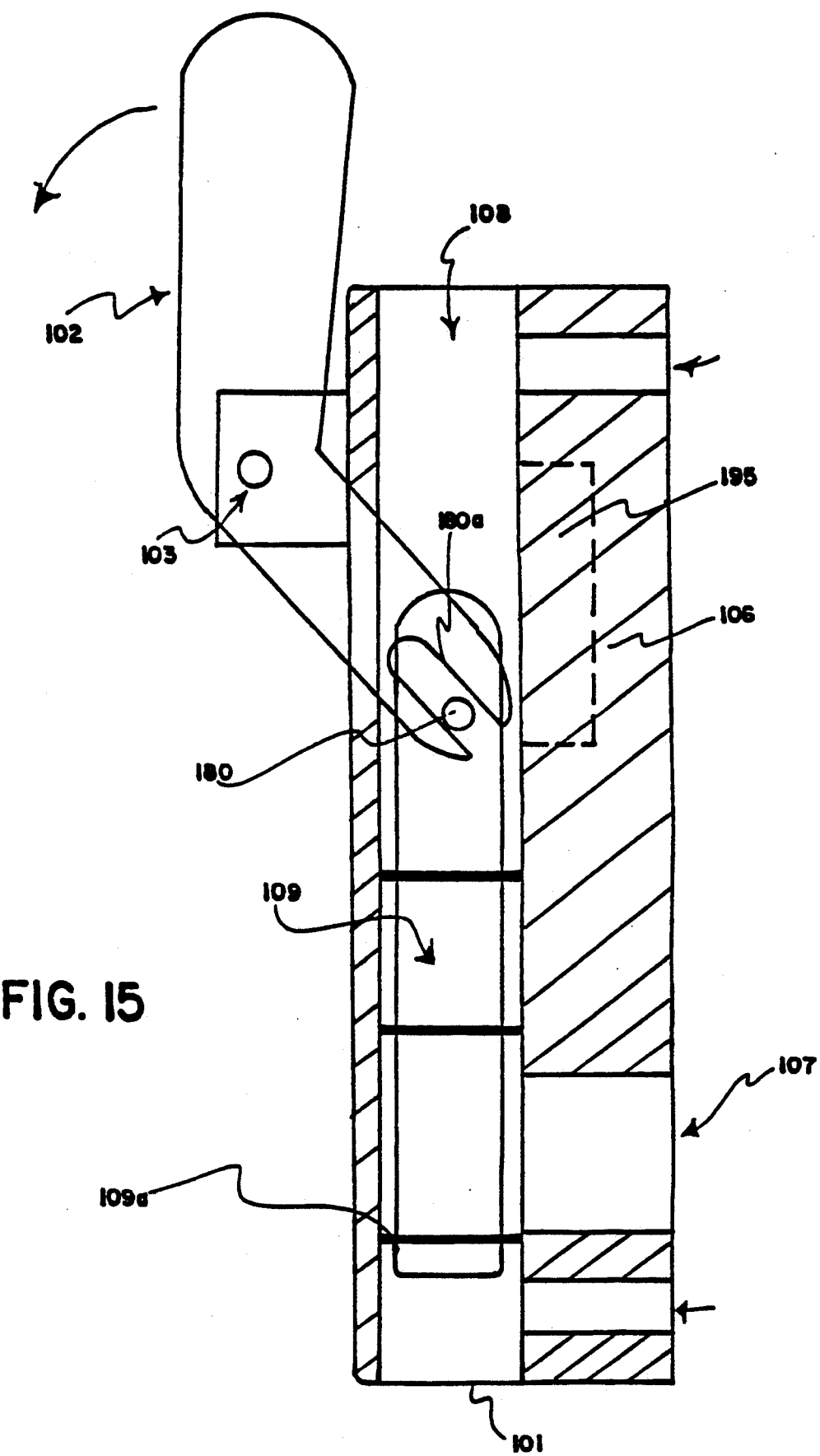
FIG. 15 is a schematic of a dispensing handle valve.

FIG. 15 illustrates the operation of the dispensing handle more clearly. As handle 102 is pulled down, in the direction of the arrow, the handle pivots around point 103. The lower end of handle 102 swings upward into an open slotted area 195, indicated by dashed lines in FIG. 15 . As the lower end of handle 102 swivels upward it carries plunger 109 upward by means of knob 180 contained within handle slot 180a. In such a manner, plunger 109 is raised to permit communication between slot channel 107, the lower portion of channel 108 and opening 101.

Figure 11:
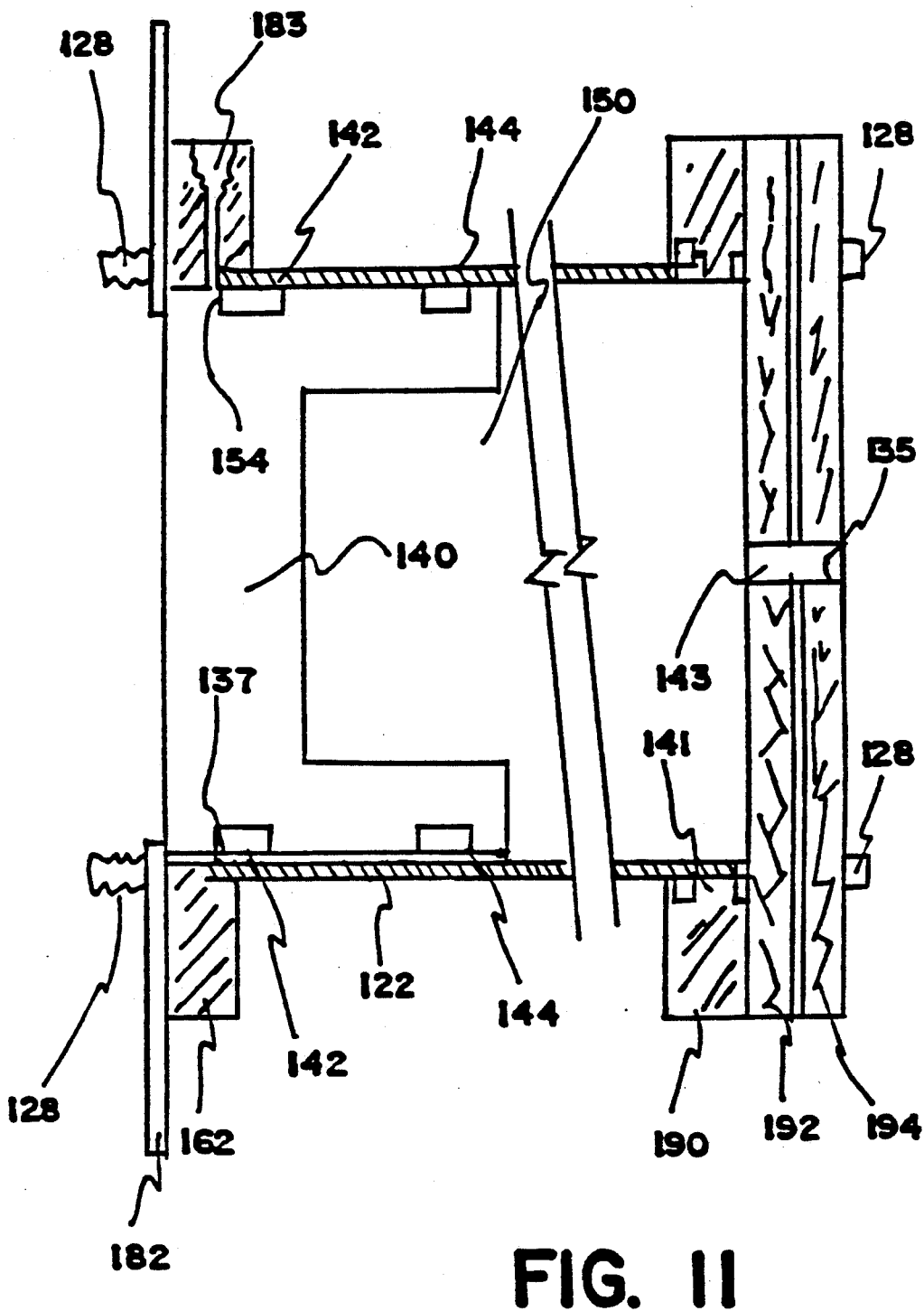

FIG. 11 illustrates that aperture 154 provides communication for pneumatic air into front chamber 152 of cylinder 122 by means of channel and fitting 183 cut into front end flange 162. FIG. 11 illustrates piston 140, that in the preferred embodiment is comprised of aluminum, as cut into a C shape to reduce weight. Opposing cup type pneumatic seals 142 and 144 are illustrated schematically in piston 140. Cup seal 142 is designed and installed such that it seals between piston 140 and the wall of cylinder 122 upon the force of air pressure from the rear of the cylinder in pressure chamber 150. Seal 142 will tend to collapse upon receiving net air pressure from the front or opposite direction. Alternately, cup seal 144 is installed such that it tends to collapse and not seal upon the receipt of air pressure from pressure chamber 150, in the rear of the cylinder, and tends to expand and seal between piston 140 and cylinder 122 upon receipt of air pressure from the forward or opposite direction from chamber 152.

Figure 16:
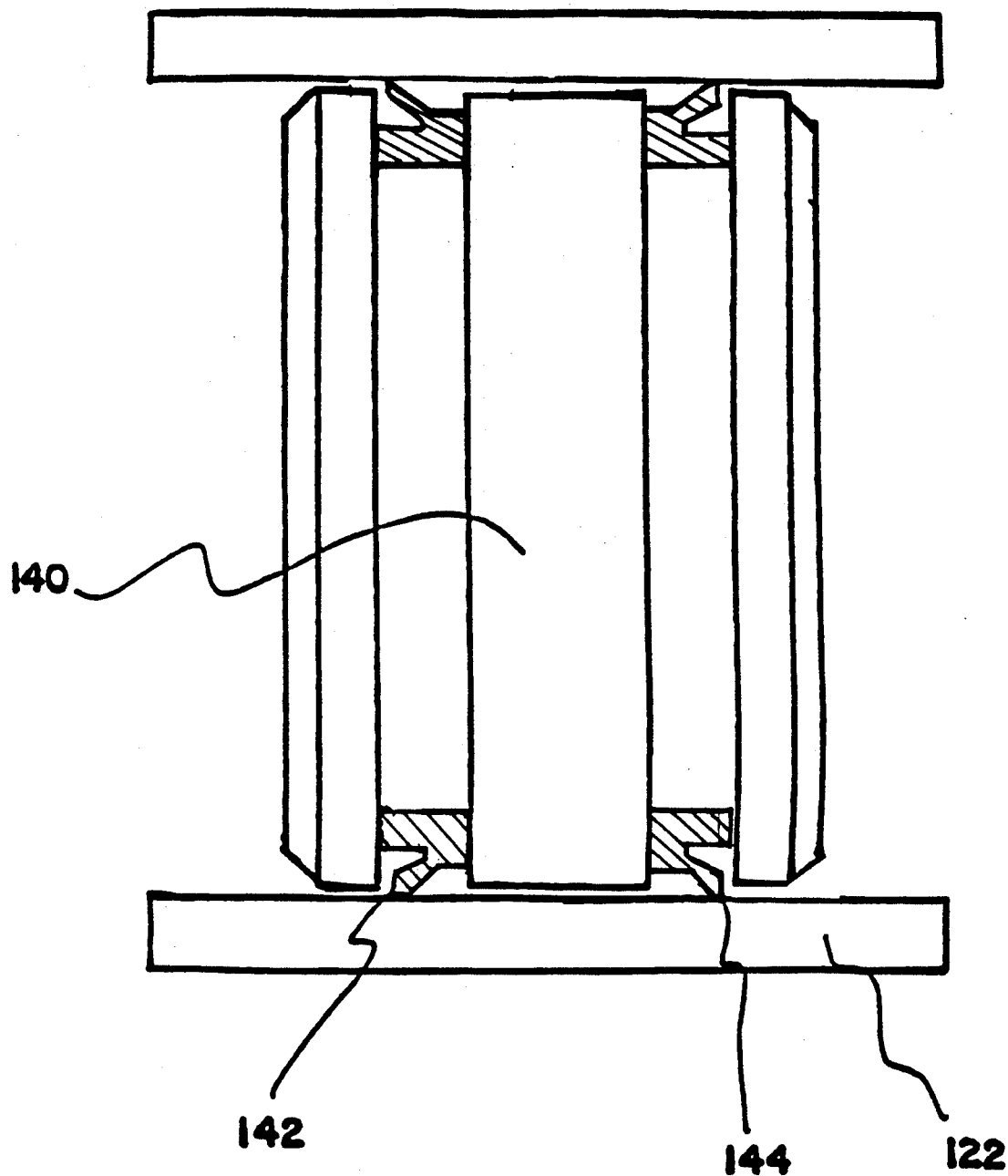
FIG. 16 is a schematic of a piston and seals.

FIG. 16 illustrates in greater detail a typical pneumatic seal for a pneumatic piston cylinder actuator. These cup type seals are referred to more particularly as K seals. Such K seals, as known in the art, offer a positive sealing, low friction pneumatic seal.

Figure 12:
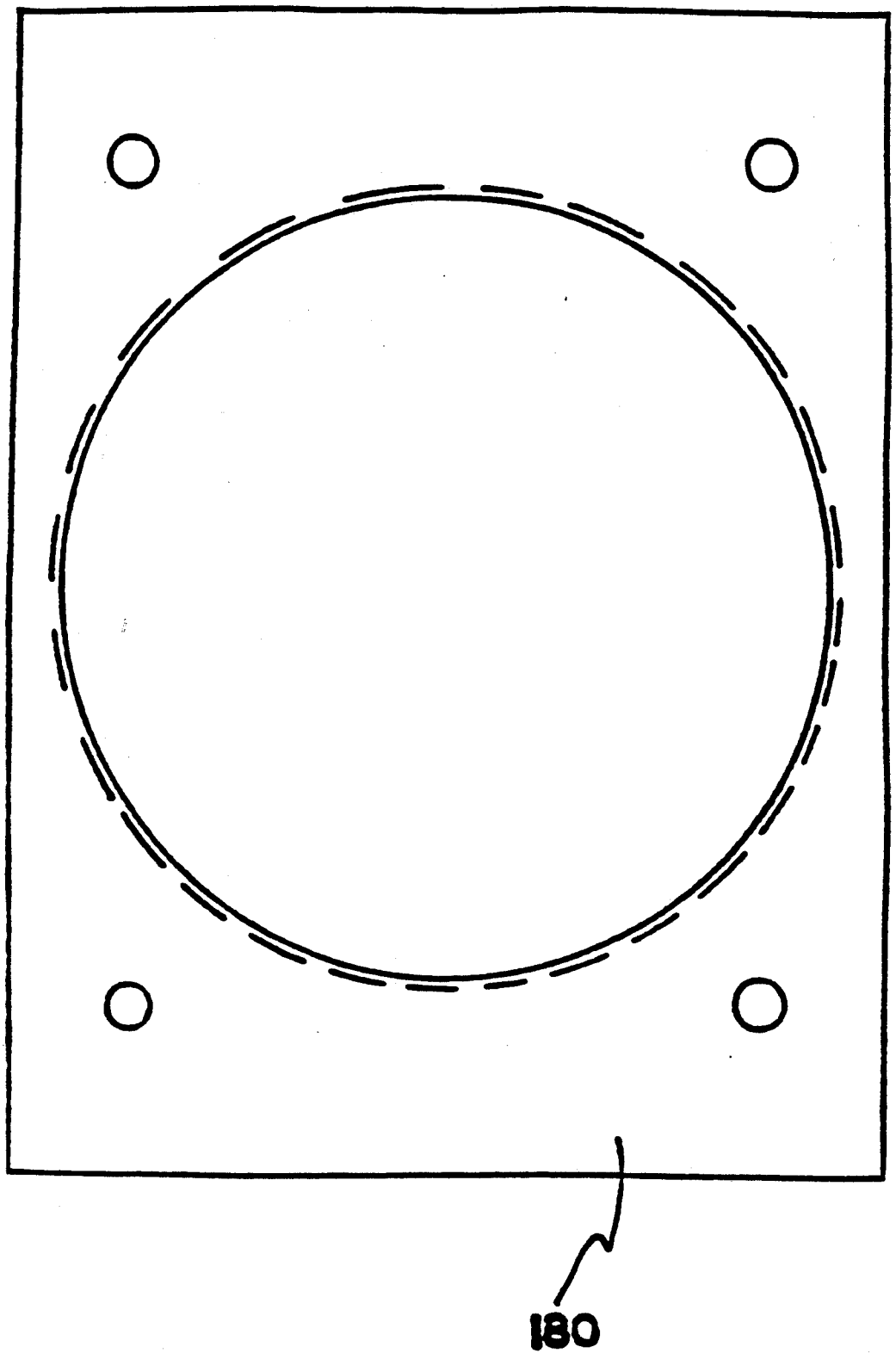
Figure 13:
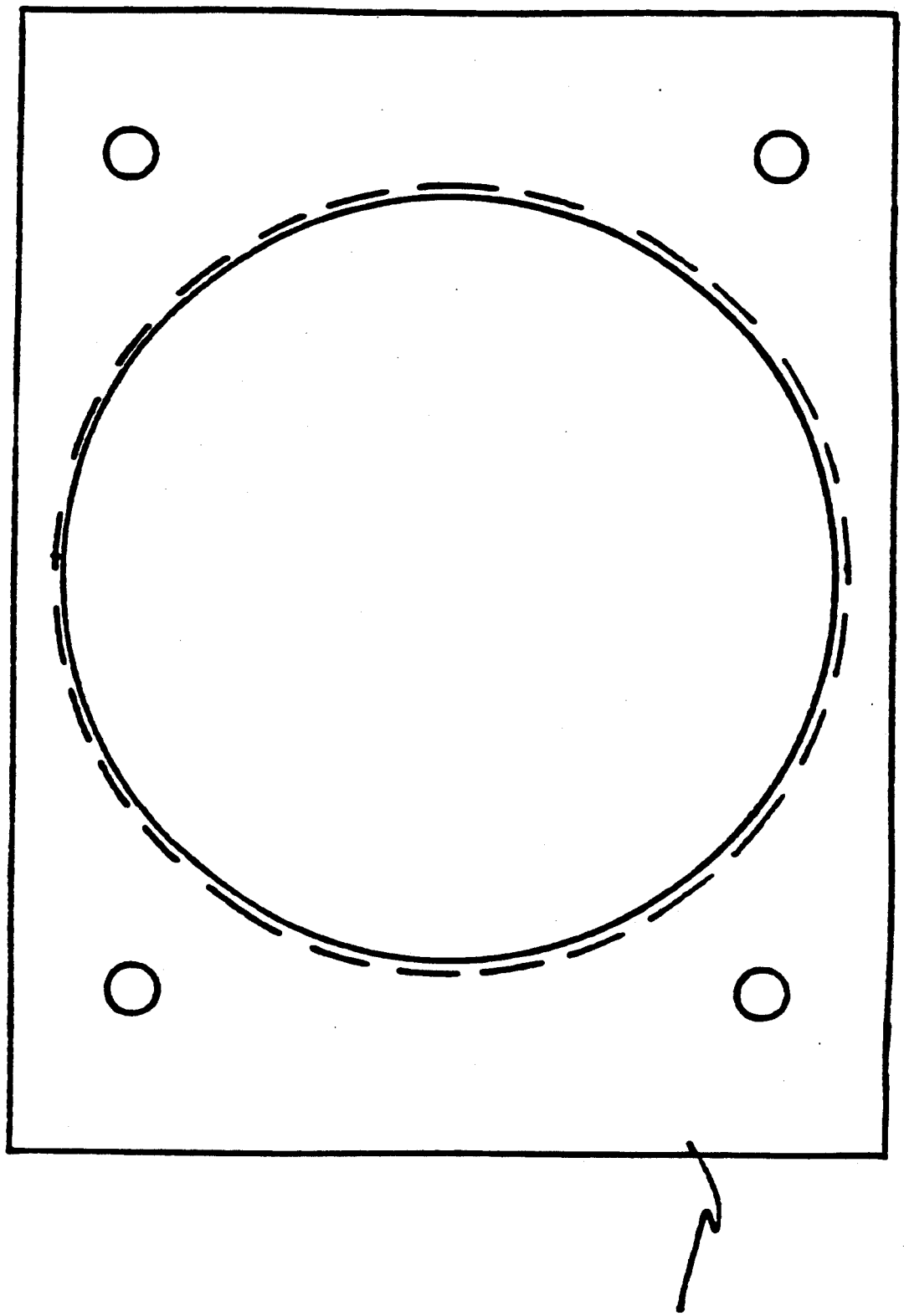

FIGS. 12 and 13 illustrate front views of end flange piece 190 and (rear pieces) and 162 (front piece), illustrating cut out shoulders 137 and 141 into which the flanged end pieces receive and securely hold cylinder 122. As can be seen, holes are provided in end pieces 180 and 190 for the passage through of structural rods 128. In the rear of cylinder 122, the end piece sets are comprised not only of flanged end piece 190, with shoulder 141 for receiving cylinder 122, but also of solid end piece 192 comprised of an insulating material, and solid end piece 194. The exception to the solidity of the rear end pieces is aperture 135 and passage 143 in both end pieces 192 and 194, provided for the communication of the pneumatic air.

Figure 14:
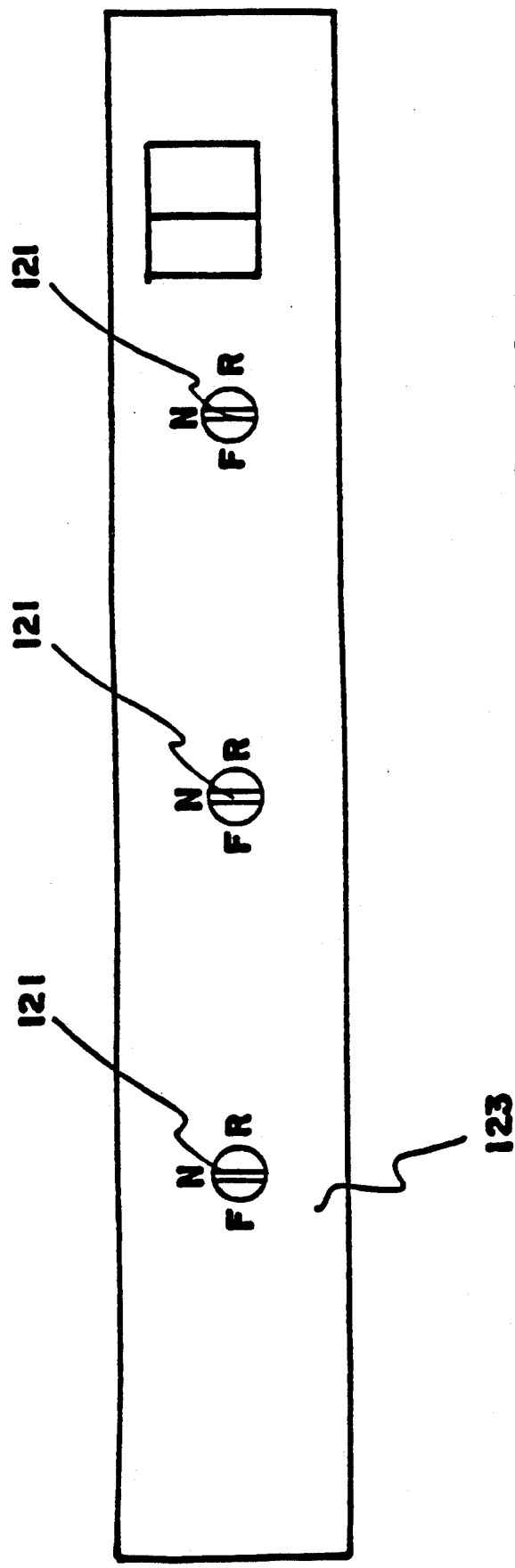
FIG. 14 is a schematic of the air valve switch.

FIG. 14 illustrates the front plate element 123 for air valve 120. FIG. 14 illustrates that air valve 120 contains three settings for each cylinder. In one "F" setting of switch 123, achieved by manipulation of toggle 121, air is routed from the pneumatic air source 110 through pneumatic air communication tubing 115 to the rear of cylinder 122 and into pressure chamber 150. In the second or "N" setting of toggle 121 in switch 123, air is exhausted from chamber 150 through aperture 135, communication tubing 115 and air valve exhaust port 123. In the third, or "R" setting for toggle 121 and switch 123, pneumatic air is routed form air source 110 through air valve 120 and aperture 154 into second chamber 152 and to the front pressure chamber 152 of cylinder 122. In this "R" setting, air in pressure chamber 150 is also exhausted through aperture 135, communication tubing 115 and air valve exhaust port 123.

Having described the invention above, various modifications of the techniques, procedures, material and equipment will be apparent to those in the art. It is intended that all such variations within the scope and spirit of the appended claims be embraced thereby.

What is claimed is:

1. Apparatus for pneumatically dispensing a bagged soft product at temperatures between 0° F. and 30° F. using low pressure air, comprising
   a cylinder for containing the bagged product, the inside surface of the cylinder having a low friction index;
   a front end piece and a rear end piece, abutting a front end and a rear end of the cylinder, respectively;
   a free-floating piston with seal, located within the cylinder between the front end piece and the rear end piece the piston and seal dimensioned to sealably and slidably engage the walls of the cylinder, the piston, cylinder and rear end piece defining a first pressure chamber within the cylinder; and
   means for communicating low pressure pneumatic air to the first chamber of the cylinder.

2. The apparatus of claim 1 wherein the cylinder has a high dimensional stability in the 0° F. to 30° F. temperature range, where high dimensional stability for a 6 inch diameter cylinder comprises approximately 12 times $10^{-6}/°K$.

3. The apparatus of claim 1 wherein the cylinder is comprised of thermal insulating material.

4. The apparatus of claim 1 wherein the piston contains a plurality of seals.

5. The apparatus of claim 1 that includes refrigeration means and wherein the means for communicating pneumatic air and the refrigeration means are electrically powered by 110 volts.

6. The apparatus of claim 1 wherein the cylinder, the piston and the front end piece define a second pressure chamber.

7. The apparatus of claim 6 including a first and second aperture in the first and second pressure chambers, respectively, the apertures connected to the means for communicating pneumatic air.

8. The apparatus of claim 7 including an air valve attached to the means for communicating pneumatic air, the valve having a first setting that directs pneumatic air to the first pressure chamber.

9. The apparatus of claim 8 wherein the air valve has a second setting that directs pneumatic air to the second pressure chamber.

10. The apparatus of claim 9 wherein the air valve has an exhaust means for communicating air from the first chamber to regions outside of the apparatus when the air valve is in the second setting.

11. The apparatus of claim 10 wherein the air valve has a third setting that communicates air from the first chamber to regions outside of the apparatus.

12. The apparatus of claim 1 that includes an air dryer attached to the means for communicating pneumatic air.

13. The apparatus of claim 1 that includes refrigerator coils attached to the apparatus, the coils maintaining the temperature of the product in the cylinder in a range between 0° F. and 30° F.

14. The apparatus of claim 13 wherein the coils are spaced from the cylinder wall.

15. The apparatus of claim 14 wherein the spacing of the coils from the cylinder wall is between 3/16 of an inch and ½ of an inch.

16. The apparatus of claim 13 that includes a heat conducting plate in contact with the refrigerator coils.

17. The apparatus of claim 16 wherein the plate is located on a side of the coil opposite the cylinder wall.

18. The apparatus of claim 1 that includes a lubricant applied to the interior surface wall of the cylinder.

19. The apparatus of claim 18 wherein the lubricant is comprised of an FDA silicone lubricant.

20. The apparatus of claim 1 that includes an air pressure regulator means attached to the means for communicating pneumatic air, the regulator means having an air pressure monitor and a means for adjusting the pressure of the pneumatic air.

* * * * *